Aug. 15, 1933.  J. A. HEANY  1,922,804
TRANSMISSION MECHANISM
Filed Feb. 24, 1931  3 Sheets-Sheet 1

INVENTOR
JOHN ALLEN HEANY
BY Chester N Braselton
ATTORNEY

Aug. 15, 1933.  J. A. HEANY  1,922,804
TRANSMISSION MECHANISM
Filed Feb. 24, 1931  3 Sheets-Sheet 2
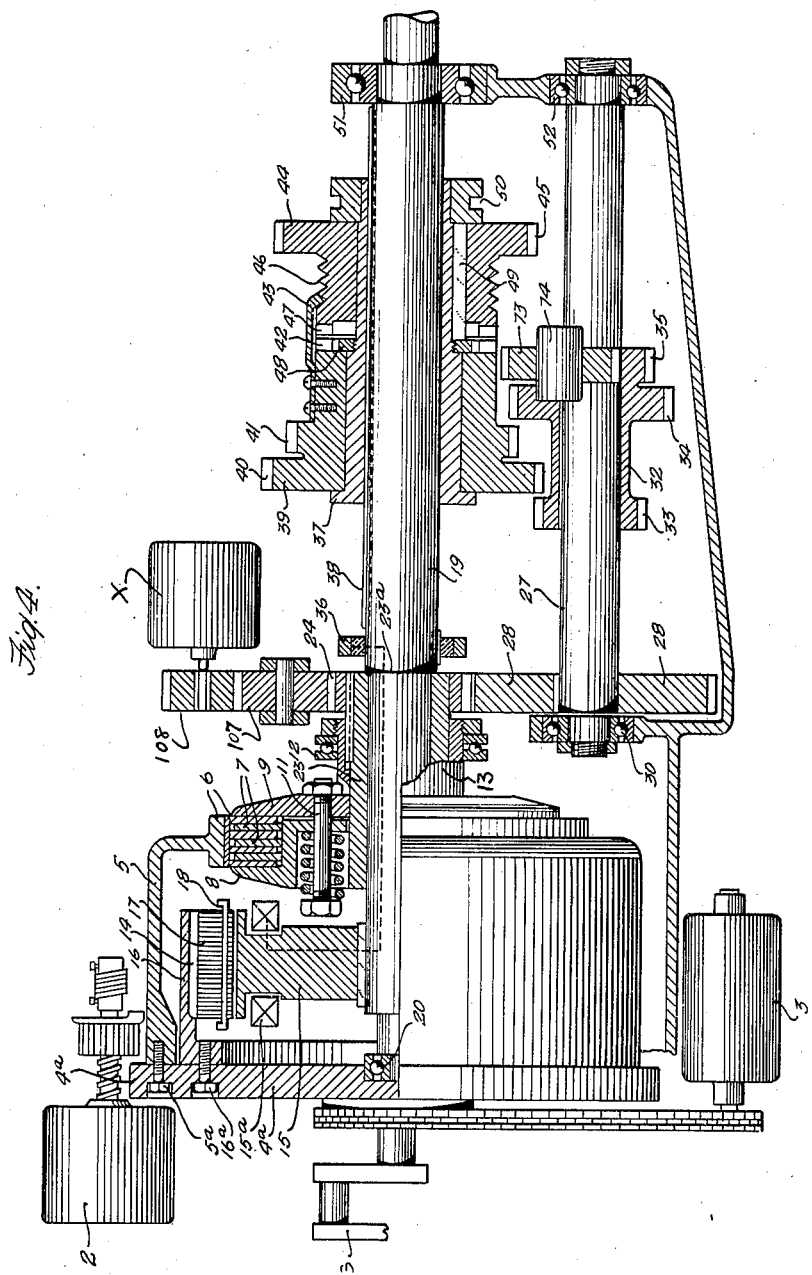
INVENTOR
JOHN ALLEN HEANY
BY
ATTORNEY Aug. 15, 1933.                J. A. HEANY                1,922,804
                         TRANSMISSION MECHANISM
                          Filed Feb. 24, 1931        3 Sheets-Sheet 3
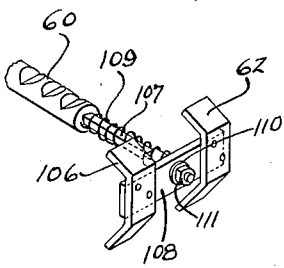
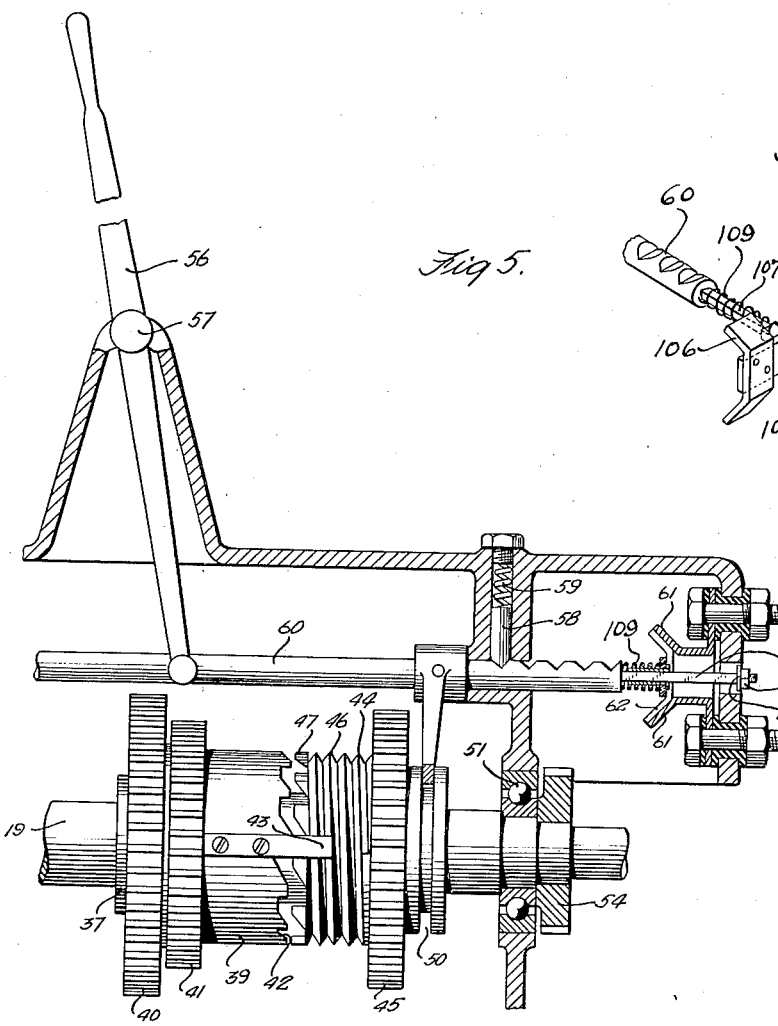
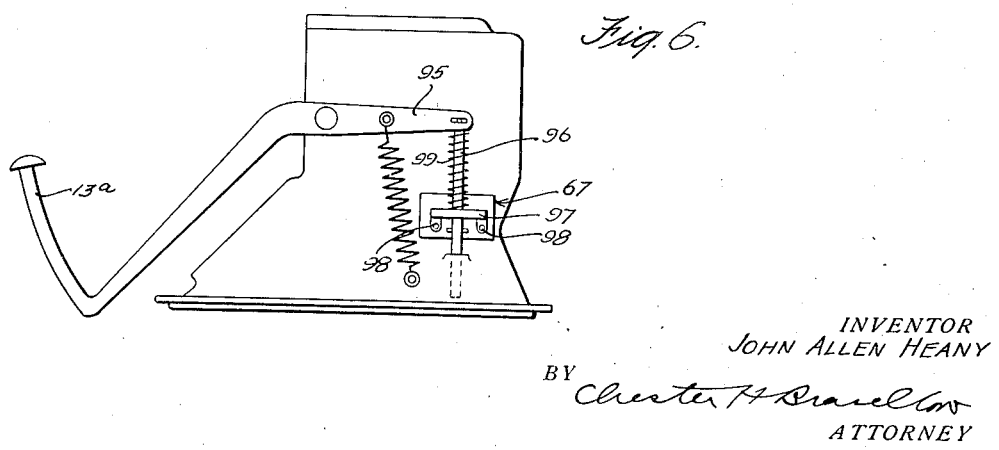
INVENTOR
JOHN ALLEN HEANY
BY
                ATTORNEY Patented Aug. 15, 1933

1,922,804

UNITED STATES PATENT OFFICE 1,922,804

TRANSMISSION MECHANISM

John Allen Heany, New Haven, Conn., assignor, by mesne assignments, to Heany Transmission Company, a Corporation of Connecticut Application February 24, 1931. Serial No. 517,751

9 Claims. (Cl. 172—239)

This invention relates to improvements in transmission systems such as are particularly adapted to self-propelled motor vehicles with a combination electro-magnetic and mechanical transmission. It is an improvement over that described and disclosed in my application Serial No. 538,233, filed February 21, 1922, Patent #1,794,613, issued March 3, 1931, and entitled "Transmission system".

As described in my prior application a mechanical gear reduction mechanism and an induction clutch are connected in parallel between the prime mover and shaft. The arrangement is such that the gear reduction mechanism tends to drive the propeller shaft at a speed greatly reduced from that of the prime mover while the induction clutch tends to drive the propeller shaft at approximately the same speed so that if the torque of the induction clutch is great enough the load is taken up directly by the induction clutch, the propeller shaft being permitted to turn faster than the reduction gear by means of an overrunning clutch associated therewith. An exciter driven by the propeller shaft furnishes the field excitation for the clutch.

Inasmuch as the exciter is driven by the driven shaft its voltage is zero when the car is standing and consequently the torque of the induction clutch is zero and does not start to build up until after the car begins to move. As soon as the car starts the exciter voltage and clutch torque begin to progressively increase as the car accelerates. It will be evident that there is inherently in this system a considerable time interval from the first engagement of the mechanical clutch associated with the gear reduction mechanism to the time when sufficient excitation is transferred to the induction clutch to build up its direct torque sufficiently to take up the load, wherefore during this time interval all or a large part of the torque is transmitted through the gear reduction mechanism so that at starting and during the initial acceleration the opertion is somewhat similar to the usual drive.

It is one of the objects of the present invention to secure earlier excitation for the field of the induction or magnetic clutch so that although the clutch is slipping some of the load will be carried thereby.

Another object of the invention is the operation of the exciter at higher speed during the starting condition.

A still further object of the invention is to provide separate excitation for the exciter unit so that it will immediately generate a current as soon as it starts to rotate.

Other objects of the invention and objects relating to the construction and operation of the various parts will be apparent as the description of the invention proceeds.

An embodiment of the invention has been illustrated in the accompanying drawings in which:

Fig. 4 is a longitudinal sectional view of one type of induction clutch and gear set with the other electrical units shown in elevation and all assembled with engine shaft and flywheel;

Fig. 5 is a sectional view illustrating the manual control used with the construction shown in Fig. 4;

Fig. 5a is a perspective view showing the switches of Fig. 5 more in detail; and Fig. 6 illustrates the control of the safety switch.

Figure 1:
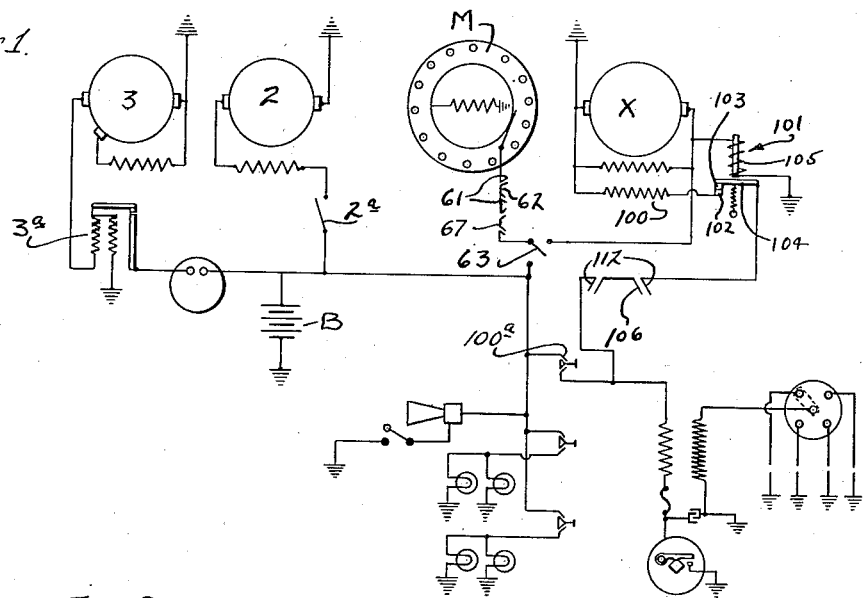
Fig. 1 is an electrical diagram of the various units of the invention.

Referring now more specifically to the drawings, Fig. 1 shows a schematic wiring diagram of the complete electrical system, wherein the motor 2, generator 3, starting switch 2a, reverse current relay 3a and battery B are the same as used in ordinary practice. An exciter X is arranged to furnish current to the field of the induction clutch unit M, all operating as will appear, the induction clutch cooperating with mechanical speed changing means dependent upon the relative speeds of engine shaft and rear axle of the car and the torque requirements. The exciter X is of the self-exciting type but may be provided with an additional field coil 100 adapted to be excited from the battery B through the ignition switch 100a. For this reason a selector switch 101 may be provided having a fixed contact 102 normally engaged by a movable contact 103 attached to an armature 104. A magnet coil 105 is so connected that it will move the armature toward it thereby separating the contacts and breaking the circuit from the battery when the self-induced excitation of the exciter is sufficient to maintain its potential output. A suitable switch 106 may also be provided in the circuit between the auxiliary field coil 100 and the battery so that the circuit may be broken when the car is standing still.

Fig. 4 shows a longitudinal section of the complete system, in which S represents the ordinary engine or prime mover, 2 the starting motor, 3 the charging generator, 4 the flywheel with gear teeth 4a provided for meshing with the pinion on starting motor 2, the arrangement so far being similar to that used in ordinary practice. The supporting member 5 fastened to flywheel 4 by means of bolts 5a carries one member 6 of a multiple disc type of friction clutch. The driven member 7 of this mechanical clutch is mounted on a rotor 8 which is keyed to sleeve 23 which is free to rotate on main drive shaft 19. Sleeve 23 also carries a driving pinion 24. The sleeve 23 bears against a shoulder 23a which is formed on the shaft 19 by that portion between the shoulder and the flywheel being slightly less in diameter than the remainder of the shaft.

The armature 14 of a dynamo electric machine forming the induction clutch is shown here rotatably mounted with respect to field member 15 which is keyed to the end of the shaft 19 between the sleeve 23 and the flywheel 4. The armature 14 is represented here as made of laminations 17 and carrying a closed squirrel cage or other type of alternating current winding 18 supported in a shell 16 which is permanently or fixedly fastened to the flywheel 4 by stud bolts 16a or by other means. The main shaft 19 is supported by ball bearings 20 in the flywheel and 51 in the outer case.

Mounted on the main shaft 19 is a sleeve 37 slidably keyed thereto, on which is mounted part 39 which consists of gears 40 and 41 and jaw clutch 42 so arranged as to turn freely on sleeve 37 but kept from moving along the sleeve by nut 48 as shown in Fig. 4. Sleeve 37 also carries a part 44 slidably keyed thereto by key 49 which carries a gear 45 and jaw clutch 47, also a coarse pitch thread 46, in which a spring nut 43 carried by part 39 and shown at 43 engages. Longitudinal movement along the shaft is imparted to sleeve 37 by means of grooved collar 50.

Further details of this shift mechanism are shown in Fig. 5, in which 56 represents a shifting lever hinged at 57 and cooperating with a pin 58 backed up by spring 59, so arranged that it engages with the notches in bar 60 which is moved longitudinally by the lower end of the lever 56 thus absolutely determining the different positions and shifting by straight line motion. The countershaft 27 is supported in the case by ball bearings 30 and 52 and carries gear 28 which is always in mesh with pinion 24 on sleeve 23. Countershaft 27 also carries part 32 consisting of gears 33, 34 and 35 fixedly keyed thereto. An idler gear 73 is supported on shaft 74 and continuously meshes with gear 35 and is used for reverse driving. Gears are so designed that 33 will mesh with 40 for low gear, 34 with 41 for second gear or 73 with 45 for reverse, according to the running position determined by shift lever 56. The neutral positions necessary when changing from one position to another are also made positive by suitable notches as shown.

The exciter X is mounted so as to be driven by the gear 24 which is rigidly attached to the sleeve 23. An idler gear 107 may be rotatably mounted to mesh with the gear 24 and may in turn mesh with a gear 108 attached to the shaft of the exciter X as indicated. These gears may be chosen so as to give any desired speed to the exciter shaft with respect to the sleeve 23. With this construction the exciter is driven by the engine at a speed proportional thereto as long as the clutch members 6—7 are in frictional engagement and may be made to rotate at high speed if desired. A slip ring 36 insulatedly fastened to shaft 19 is provided, whereby the field current is conducted from the outside to the revolving field member.

The friction clutch 6—7 is normally held closed by means of clamping ring 9 which is urged toward part 8 by means of springs 10 which surround bolts 11 and are under tension between the nuts on the ends of the bolts and the opposite side of part 8, but there is provided a bearing 12 mounted on a sleeve 13 formed integral with the part 9 whereby the pressure of 9 can be relieved through a foot pedal 13a (Fig. 6) similar to ordinary methods.

In the field circuit for the induction clutch is provided a safety switch consisting of contacts 61 and short circuiting member 62 so arranged that it is closed only when shift lever 56 is in forward driving position as shown in Fig. 5, whereby the induction clutch unit is inoperative for the reverse position of the shift lever 56. A three point switch as shown at 63 is also provided in the field circuit. This switch is normally closed so as to connect exciter current to the field but may be so connected as to provide field current from the storage battery system in case of any trouble with the exciter. A switch 106 between the auxiliary field coil for the exciter and the battery may be provided so that the latter may be disconnected from the exciter when the car is at rest or the engine is idling to avoid running the battery down at such times.

For convenience both switches 62 and 106 may be arranged to be operated by the bar 60 so that both are open when the shift lever is in the reverse position and both are closed when the shift lever is in either of the two forward running positions. To this end the bar 60 is provided with a reduced square end portion 107 which carries slidably mounted thereon an insulator plate 108 which is urged outwardly by a spring 109 but prevented from passing over the end of the bar 60 by a washer 110 held by a nut 111. With this construction the bar 62 is held against the contacts 61 and the bar 106 is held against the contacts 112 (not shown in Figs. 5 and 5a) by the spring 109 pushing against the insulation plate 108 when the shift lever is in forward running position, but both bars are drawn away from the contacts when the shift lever is moved to reverse position.

The auxiliary field coil 100 is preferably connected to the load side of the ignition switch 100a so that if the engine is stopped with the lever 56 in either of its forward running positions the battery will not discharge through the auxiliary field.

If desired an additional safety switch 67 may be provided in the circuit between the field of the induction clutch and the exciter. This switch may be operated by the clutch pedal 13a shown in Fig. 6. An extension 95 of the clutch pedal has a rod 96 pivotally connected to it which carries a connecting bar 97 adapted to bear against a plurality of contacts 98. A spring 99 permits a slight resiliency of the contact member 97 which is adapted to make connections between the contact 98 at all times except when the clutch pedal is depressed.

Without this switch if the excitation for the magnetic clutch is taken from the battery the magnetic clutch would be energized and would tend to move the car even though the friction clutch pedal were depressed and the switch 67 merely prevents such an occurrence. It insures the opening of the field circuit for the magnetic clutch at any time it is desired to release the engine from the propeller shaft as is done in ordinary cars by releasing the clutch. Of course after the shift lever is in neutral the field circuit is broken by the switch 62 but if the switch lever is in forward running position where under ordinary starting conditions it might very reasonably be left, then the switch 67 is desirable.

The squirrel cage or other type of secondary of the magnetic clutch may be so designed as to give a comparatively long torque peak range.

The system of operation is as follows:

The engine is started in the usual manner through starting motor 2. With the friction clutch normally closed, countershaft 27 is driven continuously by the engine through flywheel 4, support 5, clutch members 6, 7, 8, sleeve 23, pinion 24, gear 28. Jaw clutch teeth 42 and 47 are so arranged that part 39 will drive part 44 only in a forward direction. With low gear 33—40 or second gear 34—41 in mesh, part 39 is driven by the countershaft at a speed below that of the flywheel. When the car is standing still, part 44 through key 49, sleeve 37 and key 38, is also stationary. Part 39 rotating causes part 44 to be drawn towards 39 by means of spring nut 43 working in thread 46 so that part 39 drives part 44 through the jaw clutch 42—47 and thence through to main shaft 19, thence to the wheels of the car.

When the car is standing with the engine idling and the gear lever 56 in the neutral position next to reverse the field circuit for the induction clutch will be open and hence no torque is produced in the clutch and the parts slip freely over one another. When it is desired to start the car the clutch pedal is depressed thereby releasing clutch plates 6—7 and opening switch 67 for the magnetic clutch field and the gear lever 56 may be pushed to a forward running position. This closes the switch 62 for the magnetic clutch field but this circuit is still open by the switch 67 attached to the clutch pedal. The exciter however has a battery connection with its auxiliary field through the switch 106, which is also closed with the shifting of the lever 56, and is ready to generate the instant it starts to rotate. The clutch pedal is then slowly released, similar to the manner in which an ordinary clutch pedal is released, which starts the sleeve 23 rotating and causes the shaft 19 to rotate slowly through the gear reduction. It also causes the exciter to rotate and to instantaneously generate a voltage due to the positive field being already built up and hence torque is produced in the induction clutch. The higher the speed of the engine the greater the exciter voltage and therefore the field excitation of the clutch so that at some point of speed the torque pull of the induction clutch which is transmitted directly to the main shaft 19 is such an amount that it tends to drive shaft 19 at a higher speed than it is being driven through the reduction of the countershaft, thus causing the jaw clutch 42—47 to push open, in which position it is held by the spring nut 43, and the shaft speed continues to pick up until a comparatively low slip of the induction clutch is reached. Should an increased torque requirement such as would be occasioned by a hill or other heavy driving occur, the slip of the magnetic clutch will gradually increase, making a higher relative difference in speed between the flywheel and the main shaft. If this slip increases to the point where the tendency to drive the main shaft is at a speed slightly lower than part 39 is being driven through the countershaft reduction, jaw clutch 42—47 will again quietly mesh in and the main shaft will be driven through the gear reduction. This change can be made at any predetermined slip as arranged by the gear ratio and torque speed curve of the clutch. A particular feature of this combination is that there is no change in engine speed during the change from the combined to the direct drive or from the direct to the combined drive as is the case with any type of mechanical gear change in which there is a distinct change in engine speed in shifting from one gear connection to another. A further point is that the magnetic slip of the clutch unit is a means of smoothing out pulsations of the engine to the rear wheels.

An important feature of the operation is that one member of the induction clutch is always revolving at the speed of the main shaft and if the field circuit is closed and the field thereby partially magnetized, as at low speeds, some torque will be transmitted thereby to the main shaft in addition to that transmitted through the mechanical gear reduction and it can therefore pick up the entire load at any such time that its field becomes sufficiently strong to produce the necessary torque.

Another feature of the invention is the simplified shifting device provided, whereby all shifting can be done with a single forward and back motion of a single lever, and the normal running position of this lever will always be forward so as to be out of the way. The straight line motion also does away with the necessity of any tumblers and the definite stops provided minimize the danger of going from one gear position into another which would cause damage as for instance from low to reverse. The method shown for gear shifting is only one of many combinations that may be used for this purpose, as for example any of the systems in present practice or others which may be devised to accomplish the same results. One new system might be to eliminate the shift lever and operate the changes by means of wires or rods from the dash. Another method would be to have a manually operated electrical system for shifting which would also eliminate the shift lever and be operated by buttons on the dash or steering column. Combination of magnetic slip and second gear reduction is such that it will be very seldom necessary to use a low gear.

Figure 2:
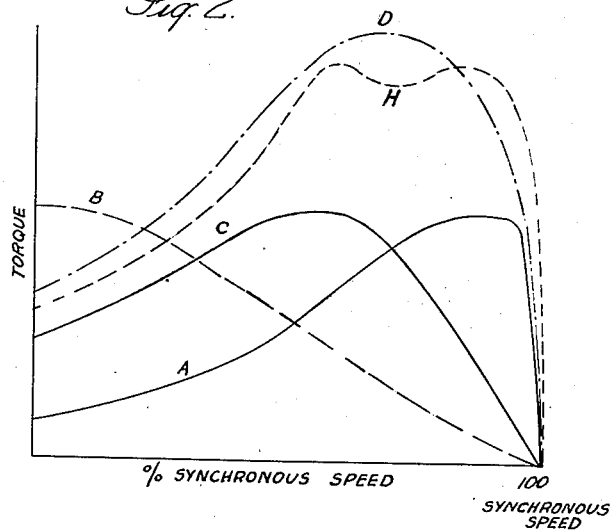
Fig. 2 is a diagram illustrating variation of torque of the induction clutch with speed.
Figure 3:
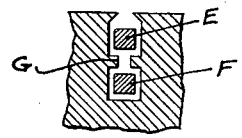
Fig. 3 is a detailed section showing one method of winding the motor secondary.

In order to produce an induction clutch having a long torque peak range I employ a squirrel cage type of induction motor with two cage windings of different resistances and locations, illustrated in Figs. 2 and 3. The ordinary squirrel cage induction motor has a speed torque curve with a shape similar to curve A of Fig. 2 with the peak within a few percent of synchronous speed. By increasing the resistance of the squirrel cage winding sufficiently in proportion to its reactance, the maximum torque point may even be made to occur at zero speed as curve B. By a different proportion of resistance and reactance this maximum may be made at some intermediate speed as shown by curve C.

A slot construction of the motor secondary similar to that of Fig. 3 can be used to support two squirrel cage or other types of windings having different resistances, the one nearer the air gap as at E having the greater while that at F approaches the resistance of copper. The winding F by its deep location in the slot, has very much higher reactance than E and this is further increased by the magnetic bridge G so that at high slip and frequency or when the engine is running appreciably faster than the car F produces very little torque, while E, due to its higher resistance and lower reactance, does produce torque. As the slip and frequency decrease due to the car speed increasing in proportion to the engine speed, the torque gradually shifts from E to F so that at normal running almost the entire torque is produced by F. The torques exerted by E and F will always add so that the net torque speed curve will have a shape similar to D or possibly with a slight dip as in H.

The shape of the torque speed curves will be the same regardless of field strength within reasonable limits but the value will vary almost in direct proportion to the field strength. This, in turn, is dependent on the voltage which is proportional to the engine speed because of the exciter being driven by the engine through the friction clutch.

The advantage over the construction shown in the above mentioned application is apparent as the torque of the induction clutch is instantaneously produced as the car is started so that the clutch assumes a load at the start and will therefore pick up the entire load much quicker giving greater acceleration at the start. The use of the battery for energizing the exciter field will only be momentarily for as soon as the exciter comes up to speed it will generate enough potential to energize its own field and the selector switch will operate thereby disconnecting the battery. The exciter will also be run at higher speeds during acceleration or at any time of considerable slip of the clutch unit because it is here driven from the engine without gear reduction in contrast with the construction in the application referred to above. Therefore, a greater field current for the induction clutch may be produced without the necessity of introducing heavy gearing to increase the speed of the exciter, and the exciter will run at a more moderate speed during the normal operation.

It is not necessary to place primary and secondary or field and armature in the relative positions as shown in the drawings, as either the primary or secondary member may be connected to the flywheel and the other to the shaft.

The direct current units (motors, generators or exciters) may be shunt machines, but some other form as series, compound, differential, third brush, or auxiliary shunt field from battery may be required in use, the generator for charging the storage battery having regulation to prevent charging at excessive rates as the same is used with a variable speed internal combustion engin. A series motor for starting would develop a maximum starting torque.

A number of divisional applications of the application above referred to which have Serial Nos. 511,678, 511,679, 511,680, 511,681, 511,682, and were filed on January 28, 1931, are directed to specific combinations of the electrical units shown in the first application, and features of the present application are susceptible of use in these various constructions.

Other modifications may be made in the construction shown without departing from the spirit of the invention and I do not therefore wish to limit the invention except as defined in the appended claims.

What I claim is:

1. In a transmission mechanism a drive shaft, a driven shaft, an induction clutch between said shafts, means indirectly operated by said drive shaft to excite said induction clutch, and means independent of said drive and driven shafts for rendering said last mentioned means instantaneously generative upon rotation thereof.

2. In a transmission mechanism, a drive shaft, a driven shaft, an induction clutch between said shafts, a generator for energizing said induction clutch, and means to render said generator instantaneously operative to furnish a potential for said clutch upon the rotation of said generator.

3. In a transmission mechanism a drive shaft, a driven shaft, an induction clutch between said shafts, a self-exciting generator adapted to furnish excitation for said clutch, and auxiliary means for separately exciting said generator for instantly starting generation upon the rotation thereof.

4. In a transmission mechanism a drive shaft, a driven shaft, an induction clutch between said drive and driven shafts, a self-exciting generator adapted to furnish the excitation for said induction clutch, means for rendering said generator instantaneously generative upon rotation thereof, and means for disconnecting said last mentioned means after said generator has been started and has become self-exciting.

5. In a transmission mechanism a drive shaft, a driven shaft, an induction clutch between said shafts, a generator indirectly connected to said driven shaft and adapted to furnish excitation for said clutch, and independent means to render said generator instantaneously operative to excite said clutch upon rotation of said generator.

6. In a transmission mechanism a drive shaft, a driven shaft, an induction clutch between said shafts, a self-exciting generator indirectly driven by said drive shaft for exciting said induction clutch, and auxiliary means for rendering said generator instantaneously operative to furnish excitation for said clutch upon the rotation of said generator.

7. In a transmission mechanism a drive shaft, a driven shaft, an induction clutch between said shafts, a self-exciting generator indirectly driven by said drive shaft, means to connect said generator with said induction clutch for exciting said clutch, auxiliary means to render said generator instantaneously generative upon the rotation thereof, and means to disconnect said last mentioned means when said generator has reached sufficient speed to be self-exciting.

8. In a transmission mechanism a drive shaft, a driven shaft, an induction clutch between said shafts, a self-exciting generator indirectly connected to said drive shaft and adapted to furnish excitation for said clutch, an auxiliary field winding on said generator, a battery, and means to temporarily connect said battery to said auxiliary field winding to render said generator instantaneously generative upon the rotation thereof.

9. In a transmission mechanism a drive shaft, a driven shaft, an induction clutch between said shafts, a self-exciting generator indirectly rotatably connected with said drive shaft, means connecting said generator with said induction clutch to excite said induction clutch, an auxiliary field winding on said generator, a battery, means to connect said battery with said auxiliary field winding to render said generator instantaneously generative upon the rotation thereof, and means connected to said generator to break the circuit of said last mentioned means when said generator is rotating at sufficient speed to become self-exciting.

JOHN ALLEN HEANY.